US011494393B2

(12) United States Patent
Vellal et al.

(10) Patent No.: US 11,494,393 B2
(45) Date of Patent: Nov. 8, 2022

(54) METHOD AND SYSTEM FOR DATA MINING

(71) Applicant: YAHOO ASSETS LLC, Dulles, VA (US)

(72) Inventors: Sainath Vellal, Sunnyvale, CA (US); Kostas Tsioutsiouliklis, Sunnyvale, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 90 days.

(21) Appl. No.: 16/597,173

(22) Filed: Oct. 9, 2019

(65) Prior Publication Data
US 2021/0056103 A1   Feb. 25, 2021

Related U.S. Application Data

(60) Provisional application No. 62/890,407, filed on Aug. 22, 2019.

(51) Int. Cl.
*G06F 16/2458* (2019.01)
*G06F 16/901* (2019.01)
*G06F 16/2457* (2019.01)

(52) U.S. Cl.
CPC .... *G06F 16/2465* (2019.01); *G06F 16/24578* (2019.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 2007/0100875 | A1* | 5/2007 | Chi | G06Q 30/02 |
| 2008/0033587 | A1* | 2/2008 | Kurita | G06Q 10/00 |
| | | | | 700/100 |
| 2008/0140471 | A1* | 6/2008 | Ramsey | G06F 16/217 |
| | | | | 702/179 |
| 2010/0100537 | A1* | 4/2010 | Druzgalski | G06Q 10/063 |
| | | | | 707/750 |

(Continued)

OTHER PUBLICATIONS

"Ontology". Computer Desktop Encyclopedia. The Computer Language Company Inc. 2021. Retrieved on Sep. 15, 2021 from https://www.computerlanguage.com/results.php?definition=ontology (Year: 2021).*

*Primary Examiner* — Tony Mahmoudi
*Assistant Examiner* — Umar Mian
(74) *Attorney, Agent, or Firm* — Venable LLP

(57) ABSTRACT

The present teaching relates to method and system for generating a stream of content items. A plurality of entities associated with a time-window are obtained, wherein each entity of the plurality of entities is associated with at least one content item. For each entity, a first parameter with respect to the time-window, a second parameter with respect to previous time-windows, and a trendiness score based on a function of the first parameter and the second parameter are respectively calculated. A graph based on one or more entity-pairs is generated, wherein each entity-pair of the one or more entity-pairs satisfies a first criterion. A stream of content items is generated based on the graph, wherein each content item in the stream of content items corresponds to at least one of the one or more entity pairs.

14 Claims, 11 Drawing Sheets

(56) References Cited

U.S. PATENT DOCUMENTS

| | | | |
|---|---|---|---|
| 2011/0179017 A1* | 7/2011 | Meyers | G06F 16/24534 707/722 |
| 2011/0282874 A1* | 11/2011 | Xu | G06F 16/313 707/769 |
| 2011/0314007 A1* | 12/2011 | Dassa | G06F 16/22 707/723 |
| 2011/0320715 A1* | 12/2011 | Ickman | G06Q 30/02 711/118 |
| 2014/0040387 A1* | 2/2014 | Spivack | H04L 51/32 709/206 |
| 2014/0283048 A1* | 9/2014 | Howes | G06F 21/55 726/23 |
| 2014/0337451 A1* | 11/2014 | Choudhary | A61B 5/1118 709/206 |
| 2015/0154278 A1* | 6/2015 | Allen | G06F 16/3344 707/737 |
| 2015/0220946 A1* | 8/2015 | Horesh | G06Q 30/0202 705/7.31 |
| 2016/0359993 A1* | 12/2016 | Hendrickson | G06F 16/951 |
| 2018/0349352 A1* | 12/2018 | Mabbu | G06F 40/30 |
| 2020/0267112 A1* | 8/2020 | Jain | H04L 67/306 |

* cited by examiner

METHOD AND SYSTEM FOR DATA MINING

CROSS-REFERENCE TO RELATED APPLICATION

The present application claims priority to U.S. Provisional Patent Application No. 62/890,407 filed Aug. 22, 2019, which is incorporated herein by reference in its entirety.

BACKGROUND

1. Technical Field

The present teaching generally relates to data mining. Specifically, the present teaching relates to mining trending entities from content items.

2. Technical Background

The Internet has made it possible for a person to electronically access virtually any content at any time and from any location. The Internet technology facilitates information publishing, information sharing, and data exchange in various spaces and among different persons. Typically, users issue a search query to a search engine to obtain desirable content. A search engine is one type of information retrieval system that is designed to help users search for and obtain access to information that is stored in a computer system or across a network of computers. In response to a query from a user, the search engine can search different content providers online to obtain search results matching the query. Content providers can be a publisher, a content portal, or any other sources from which content can be obtained.

Search engines are also equipped with data mining capabilities. Traditional data mining techniques for providing relevant or trending (i.e., popular) content rely on user interactions with the content. Specifically, a data mining system may rely on user searches, queries issued, article clicks and views in order to determine content that is trending and provide the same to users. Thus, traditional data mining systems rely solely on user interactions to determine trending content. As a result, an amount of time required to obtain trending content is large as the system has to obtain a sufficient number of samples (user interactions) to determine precisely as to which content items are trending. Accordingly, traditional data mining systems provide a lagging indicator of trendiness. Thus, there is a requirement for methods and systems to address the above outlined deficiencies of traditional data mining systems.

SUMMARY

The teachings disclosed herein relate to methods, systems, and programming for data mining. Specifically, the present teaching relates to mining trending entities from content items.

One aspect of the present disclosure provides for a method, implemented on a machine having at least one processor, storage, and a communication platform capable of connecting to a network for generating a stream of content items. The method includes the steps of: obtaining a plurality of entities associated with a time-window, wherein each entity of the plurality of entities is associated with at least one content item; computing for each entity, a first parameter with respect to the time-window and a second parameter with respect to previous time-windows; calculating for each entity, a trendiness score based on a function of the first parameter and the second parameter; generating a graph based on one or more entity-pairs, wherein each entity-pair of the one or more entity-pairs satisfies a first criterion; and generating the stream of content items based on the graph, wherein each content item in the stream of content items corresponds to at least one of the one or more entity pairs.

By one aspect of the present disclosure, there is provided a system for generating a stream of content items. The system includes a retrieving unit implemented by a processor and configured to obtain a plurality of entities associated with a time-window, wherein each entity of the plurality of entities is associated with at least one content item. The system includes a computing unit implemented by the processor and configured to compute for each entity, a first parameter with respect to the time-window and a second parameter with respect to previous time-windows, and calculate for each entity, a trendiness score based on a function of the first parameter and the second parameter. Further, the system includes a graph generator implemented by the processor and configured to generate a graph based on one or more entity-pairs, wherein each entity-pair of the one or more entity-pairs satisfies a first criterion, and a data stream generator implemented by the processor and configured to generate the stream of content items based on the graph, wherein each content item in the stream of content items corresponds to at least one of the one or more entity pairs.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is provided, non-transitory machine-readable medium having information recorded thereon for generating a stream of content items, wherein the information, when read by the machine, causes the machine to perform a method including the steps of: obtaining a plurality of entities associated with a time-window, wherein each entity of the plurality of entities is associated with at least one content item; computing for each entity, a first parameter with respect to the time-window and a second parameter with respect to previous time-windows; calculating for each entity, a trendiness score based on a function of the first parameter and the second parameter; generating a graph based on one or more entity-pairs, wherein each entity-pair of the one or more entity-pairs satisfies a first criterion; and generating the stream of content items based on the graph, wherein each content item in the stream of content items corresponds to at least one of the one or more entity pairs.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
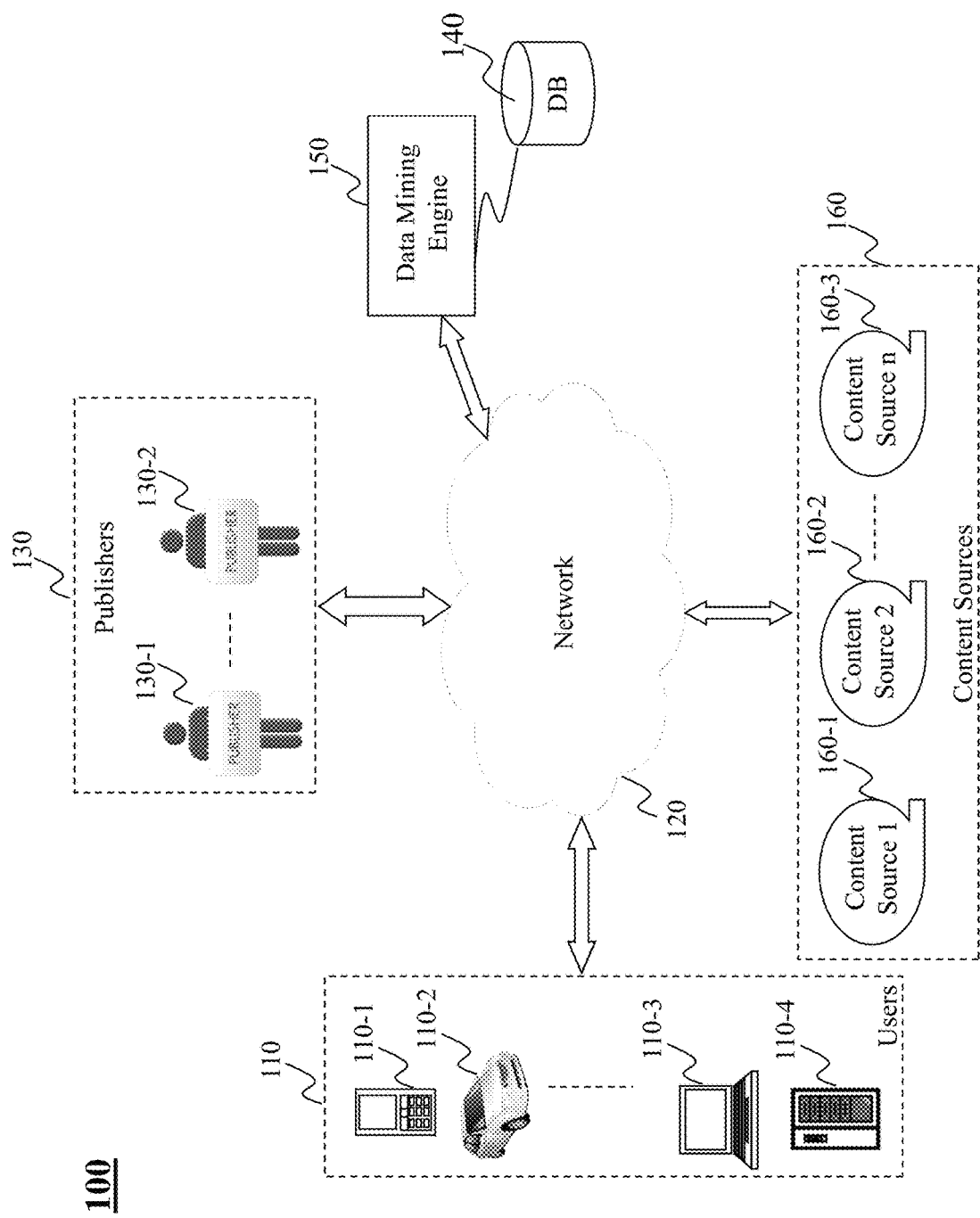
FIG. 1A illustrates an exemplary system configuration in which a data mining engine can be deployed, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

An aspect of the present disclosure provides for an automated data mining system which identifies publication patterns of content items (e.g., news articles) amongst publishers across the world, and extracts entities from the content items in defined units of time (e.g., hourly) as signals which can later on be used for a multitude of use cases, including and not limited to ranking article streams, generating streams, etc. By one embodiment, the data mining system generates two types of signals in the defined time intervals: trending entities and trending story clusters.

The data mining system of the present disclosure is unique because unlike traditional data mining systems which mine trending entities based on user input (e.g., user activities such as clicks, queries, etc.), the data mining system of the present disclosure is agnostic to user search queries, article clicks and views. The data mining system of the present disclosure mainly focuses on trends mined from publishers (who form an authority on the content they produce) and their publishing activity patterns. Moreover, as described in detail below, the data mining system of the present disclosure utilizes state of the art computations to determine what entities and stories are trending and is completely scalable across languages, segments (e.g., finance, sports, politics, etc.,) and markets.

Entities included in a content item such as a person, place, organization etc., form the DNA of the content item. By surfacing trending entities and assigning "trendiness scores" to the entities, the data mining system of the present disclosure resolves the following use cases automatically: (1) the ability to create a list of entities which are trending at any given point in time, (2) by associating article metadata with entities and their trendiness scores, one can generate a list of articles which are trending at any given point in time, (3) by applying clustering over the generated articles, one can deduplicate article sets into story clusters, so that a stream of trending story clusters can be generated every hour, (4) by imposing a threshold over the trendiness scores of entities, and looking at the past history of the trendiness scores of the entity, one can organically generate breaking stories. This forms the basis for an organically generated, unsupervised notification system which can scale across many segments (e.g., politics, sports, entertainment, finance, etc.), (5) cold start problem in a different language-aspects of the data mining system of the present disclosure may be easily transferable to international markets which tend to have a smaller number of users. User activity (e.g., clicks and views) can be later applied over the initial set of articles to further refine ranking, (6) aspects of the data mining system of the present disclosure can be readily applied across different segments (e.g., sports, finance, entertainment etc.,), (7) given a set of publishers (i.e., licensed partners), a larger pool of publishers across the world can be analyzed and the signals for trendiness can be transferred in order to infer trending story coverage across partner publications, (8) typically, popularity measures are derived from a set of users who are actively viewing/clicking on displayed content items. Such a popularity measure (referred to as a general mean popularity) is typically used as a signal to rank personalized article sets. Unfortunately, such a signal on a popular article takes a while to bubble up, and hence is a 'lagging indicator' of trendiness. Aspects of the present disclosure provide for analyzing the publisher activity in order to recognize what would become trending in the future and is thus a 'leading indicator' for trendiness. Aspects of the present disclosure can be applied to ranking and filtering in personalization applications, and (9) geo-location based trending entity determination—by analyzing which publishers corresponding to which local regions, one can analyze and present what are the local stories that are trending in a specific geographical region.

Turning now to FIG. 1A, there is illustrated an exemplary system configuration in which a data mining engine can be deployed, according to an embodiment of the present teaching. In this embodiment, the data mining engine operates as an independent service on a network. The exemplary networked environment 100 includes users 110, a network 120, publishers 130, a data mining engine 150, a database 140, and content sources 160.

The network 120 in the networked environment 100 may be a single network or a combination of different networks. For example, a network may be a local area network (LAN), a wide area network (WAN), a public network, a private network, a proprietary network, a Public Telephone Switched Network (PSTN), the Internet, a wireless network, or a virtual network, or any combination thereof. In one embodiment, the network 120 may be a content delivery network, which connects users 110 to publishers 130 or websites/mobile applications. A key function of the content delivery network is to provide the users with the most relevant content. The content delivery network may be a television ad network, a print ad network, an online (Internet) ad network, or a mobile ad network.

Users 110 may be of different types such as users connected to the network via desktop connections (110-4), users connecting to the network via wireless connections such as through a laptop (110-3), a handheld mobile device (110-1), or a built-in device in a motor vehicle (110-2). In one embodiment, user(s) 110 may be connected to the network and able to access and interact with online content (provided by the publishers) through wireless technologies and related operating systems implemented within user-wearable devices (e.g., glasses, wristwatch, etc.). A user, e.g., the user 110-1, may send a request for online content to one of the publishers, e.g., 130-1, via the network 120 and receive content through the network 120.

Publishers 130 may correspond to an entity, whether an individual, a firm, or an organization, having publishing business, such as a television station, a newspaper issuer, a web page host, an online service provider, or a game server. For example, in connection to an online or mobile ad network, publishers 130-1 . . . 130-2 can be an organization such as USPTO.gov, a content provider such as CNN.com and Yahoo.com, or a content-feed source such as tweeter or blogs. In one embodiment, publishers 130 include entities that develop, support and/or provide online content via mobile applications (e.g., installed on smartphones, tablet devices, etc.). The content sent to user 110-1 may be generated by the publisher 130-1 based on the content sources 160. A content source may correspond to an entity where the content was originally generated and/or stored. For example, a novel may be originally printed in a magazine, but then posted online at a web site controlled by a publisher. The content sources 160 in the exemplary networked environment 100 include multiple content sources 160-1, 160-2 . . . 160-3.

The data mining engine 150 analyzes content items published by various publishers 130-1, 130-2 etc., and extracts entities (e.g., person, organization, etc.) included in the content items. The extracted entities may be stored with additional information (described with reference to FIG. 2) in a database 140. As such, the data mining engine 150 may be configured to mine and surface entities that are trending (i.e., being talked about the most by different publishers) in a given time-period. Additionally, if a number of publishers are talking about a certain group of entities-which form a story, then the certain group of entities would form strong signals for determining what are the trending stories. By one embodiment, the data mining engine may also be configured to receive a user query, and in response, provide the user with a stream of content items that are related to topics which are currently trending. Details regarding the operation of the data mining engine 150 are described later with reference to FIG. 2.

Figure 1B:
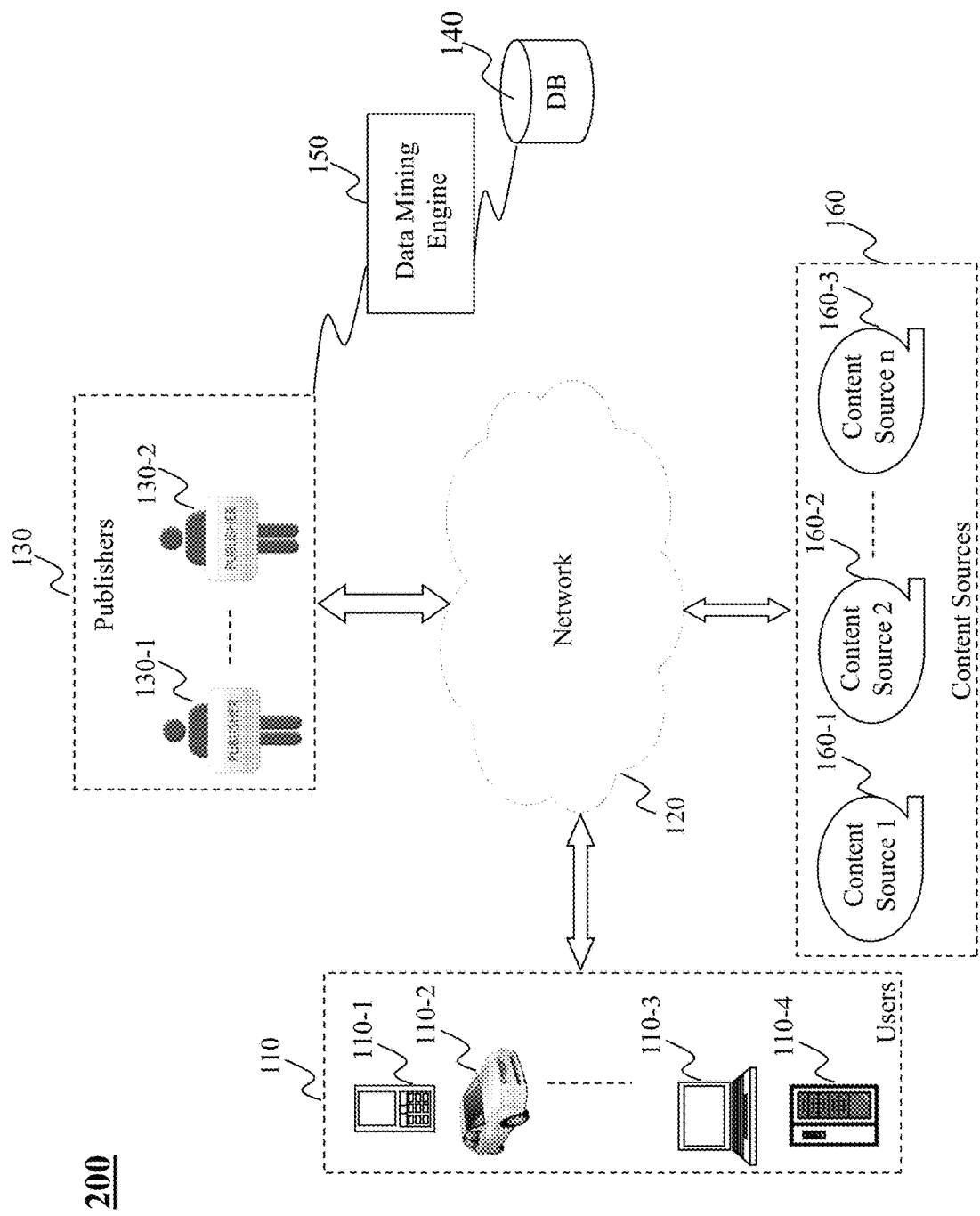
FIG. 1B illustrates another exemplary system configuration in which a data mining engine can be deployed, according to an embodiment of the present teaching.

FIG. 1B illustrates another exemplary system configuration in which a data mining engine 150 can be deployed, according to an embodiment of the present teaching. Specifically, in this embodiment, the data mining engine 150 serves as a backend service engine to the publishers 130. It must be appreciated that when there are multiple publishers, each publisher may have its own backend engine for mining trending entities.

Figure 1C:
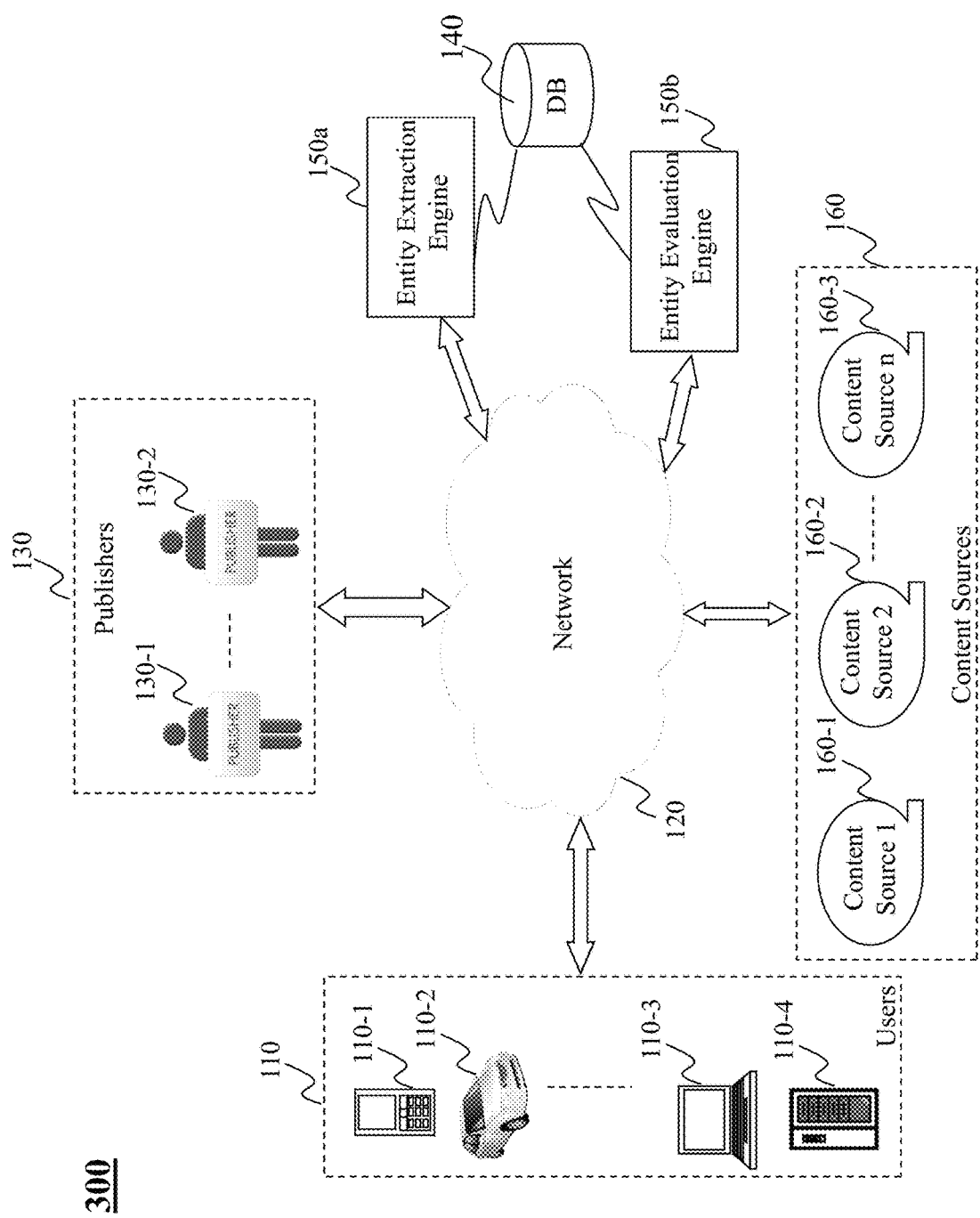
FIG. 1C illustrates an exemplary system configuration in which components of a data mining engine can be deployed, according to an embodiment of the present teaching.

FIG. 1C illustrates another exemplary system configuration in which components of a data mining engine 150 can be deployed, according to an embodiment of the present teaching. Specifically, by one embodiment of the present disclosure, the data mining engine 150 may include an entity extraction engine 150*a* and an entity evaluation engine 150*b*. As illustrated in FIG. 1C, the entity extraction engine 150*a* and the entity evaluation engine 150*b* may serve as independent services on the network.

Figure 2:
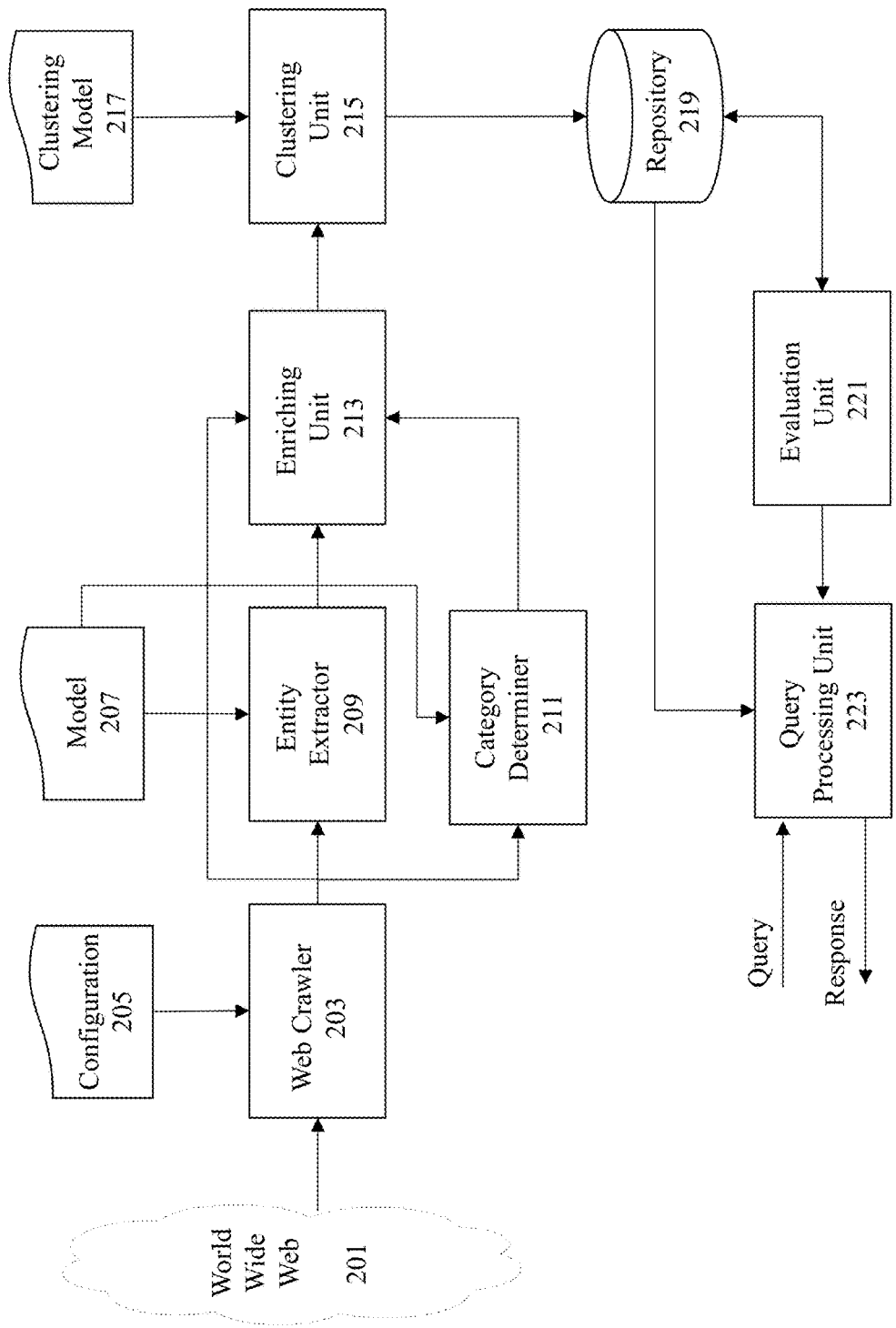
FIG. 2 depicts an exemplary high-level system diagram of a data mining engine, according to an embodiment of the present teaching.

Turning now to FIG. 2, there is depicted an exemplary schematic of a data mining engine 150, according to an embodiment of the present teaching. The data mining engine 150 includes a web crawler 203, an entity extractor 209, an enriching unit 213, a clustering unit 215, a category determiner 211, an evaluation unit 221, and a query processing unit 223. By one embodiment, the web crawler 203 is configured to crawl the world-wide-web 201 and analyze webpages/news articles in real time. The web crawler may crawl the web pages in accordance with a configuration model 205 that controls, for instance, a level i.e., a number of hyperlinks crawled from each webpage.

The crawled content items i.e., webpages, news articles, etc., are input to the entity extractor 209. The entity extractor 209 is configured to extract entities such as names of persons, organizations, places, etc., from the crawled content items in accordance with a natural language processing (NLP) model and/or a machine learning model 207. The category determiner 211 can be configured to determine a category of the content item. Specifically, the category determiner 211 may be configured to determine a category (e.g., finance, politics, sports, entertainment, etc.,) of a content item by analyzing the text include in the content item in accordance with the model 207. It must be appreciated that although the entity extractor 209 and the category determiner 211 have been shown as utilizing the same model 207 (i.e., NLP model or a machine learning model), each of the entity extractor and the category determiner may be associated with a dedicated model.

Figure 5:
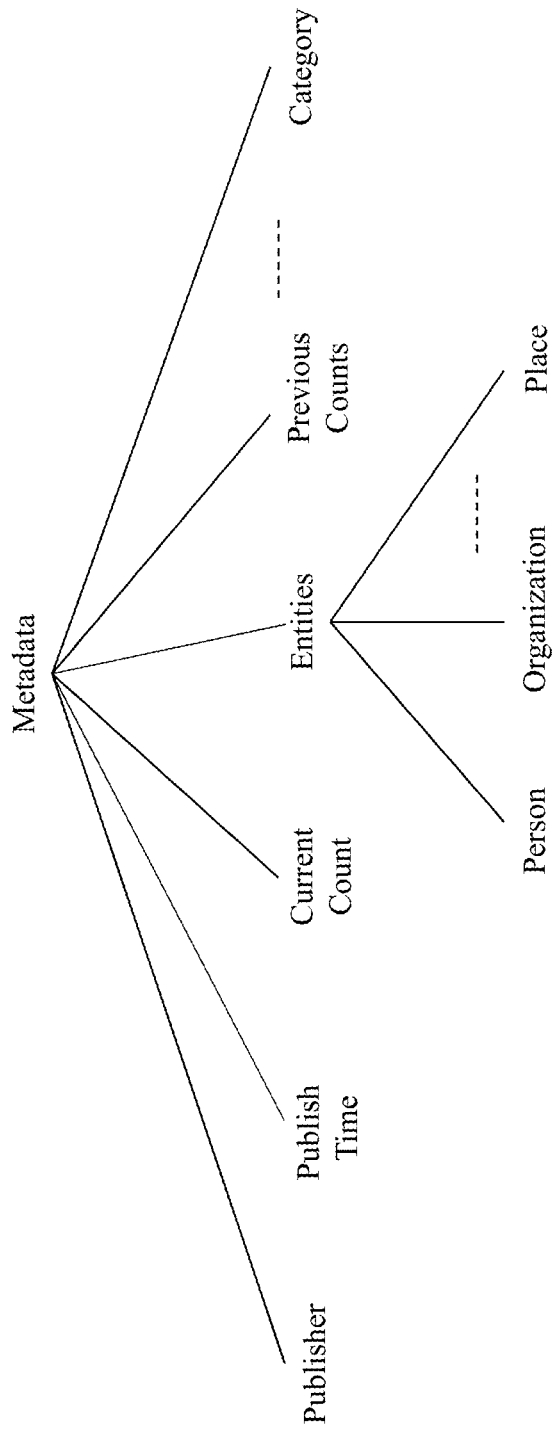
FIG. 5 illustrates meta-information associated with a content item, in accordance with an embodiment of the present teaching.

The enriching unit 213 is configured to add metadata to each content item that is crawled by the web crawler 203. By one embodiment of the present disclosure and as shown in FIG. 5, the enriching unit 213 embeds metadata including publisher of the content item, entities extracted from the content item, a category of the content item (e.g., sports related content item, politics related content item, etc.,) a current count of entities, previous count of entities, etc., in the content item. For example, the enriching unit 213 may be configured to include metadata in a web-application embedded in a webpage where the content is published.

Figure 4:
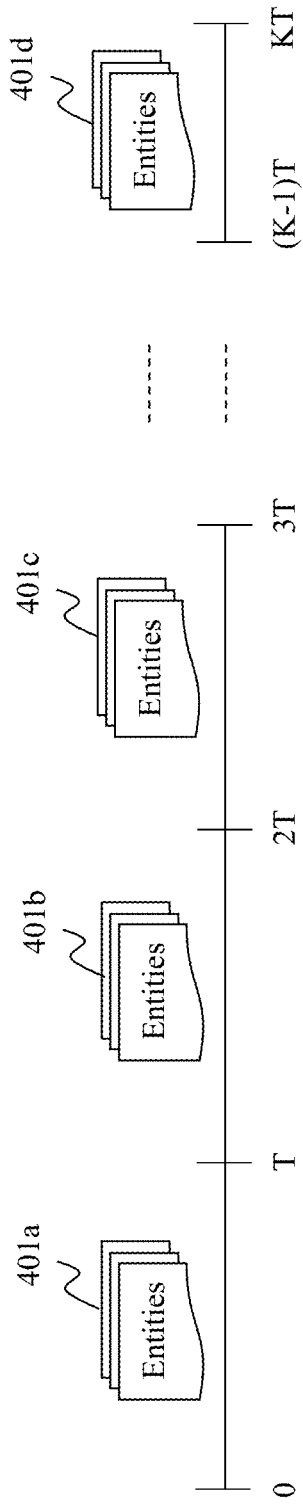
FIG. 4 illustrates exemplary time-windows including a plurality of mined entities.

The clustering unit 215 is configured by one embodiment to generate a plurality of clusters of the enriched content items. The clustering unit 215 may generate the plurality of clusters in accordance with a clustering model 217. For example, the clustering unit 215 may cluster content items based on their respective categories. By one embodiment of the present disclosure, the data mining system is configured to compute a trendiness score for each entity extracted from a content item. Specifically, the data mining engine 150 of the present disclosure is configured to compute a relative measure of how much an entity is being talked about by different publications. As such, the data mining engine may store batches of entities (along with their corresponding content items from which the entities were extracted) in time-slices or time-windows, wherein an entity is stored in a given time-window based on a discovery time of the content item (how long ago was this article discovered?) from which the entity is extracted. FIG. 4 illustrates exemplary time-windows, wherein each time-window includes a plurality of mined entities 401a, 401b, 401c, and 401d. It must be appreciated that granularity of each time window may range from tens of minutes to a few hours. The time-windows along with the batches of extracted entities are stored in a repository 219.

The evaluation unit 221 obtains the batches of entities stored in their corresponding time-windows from the repository 219 and computes a trendiness score for each entity. Accordingly, the evaluation unit 221 is configured to determine which entities are trending entities i.e., entities that are being talked about the most by different publishers. Details regarding the operation of the evaluation unit 221 are described next with reference to FIG. 6. The query processing unit 223 may obtain a query from a user. The query may pertain to a request to obtain topics/content items that are currently trending i.e., popular. The query processing unit 223 may obtain a stream of content items pertaining to trending topics (e.g., from the evaluation unit 221) and provide the same to the user in response to the query.

Figure 3:
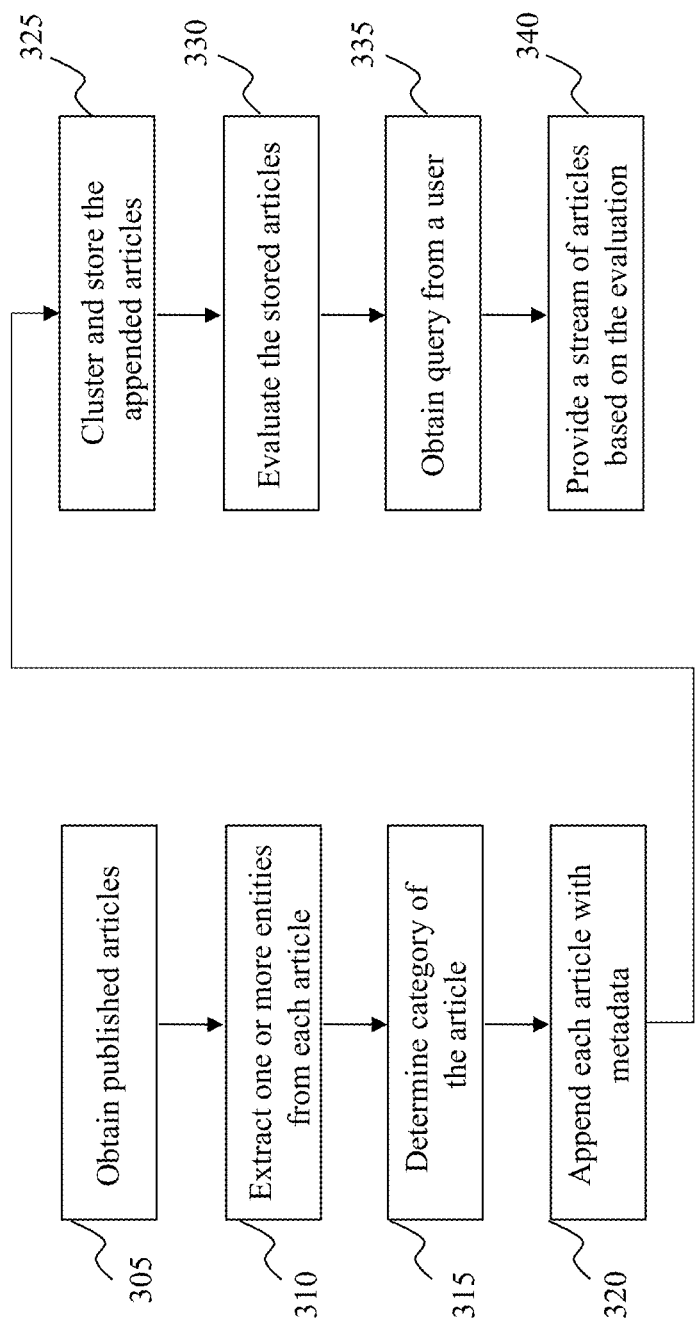
FIG. 3 is a flowchart of an exemplary process performed by a data mining engine, according to some embodiments of the present teaching.

FIG. 3 depicts a flowchart of an exemplary process performed by a data mining engine, according to some embodiments of the present teaching. The process commences in step 305, wherein the data mining system obtains published content items e.g., articles. In step 310, one or more entities are extracted from each article in accordance with an extraction model. In step 315 a category of the article is determined. In step 320, each article is appended with metadata, and in step 325 the appended articles are clustered in accordance with a clustering model and stored in a repository. In step 330, the stored articles are evaluated e.g., to determine trendiness scores of the entities (described later with reference to FIG. 6). In step 335, a query is obtained from the user, where after in step 340 a stream of articles based on the evaluation is provided to the use in response to the query.

Figure 6:
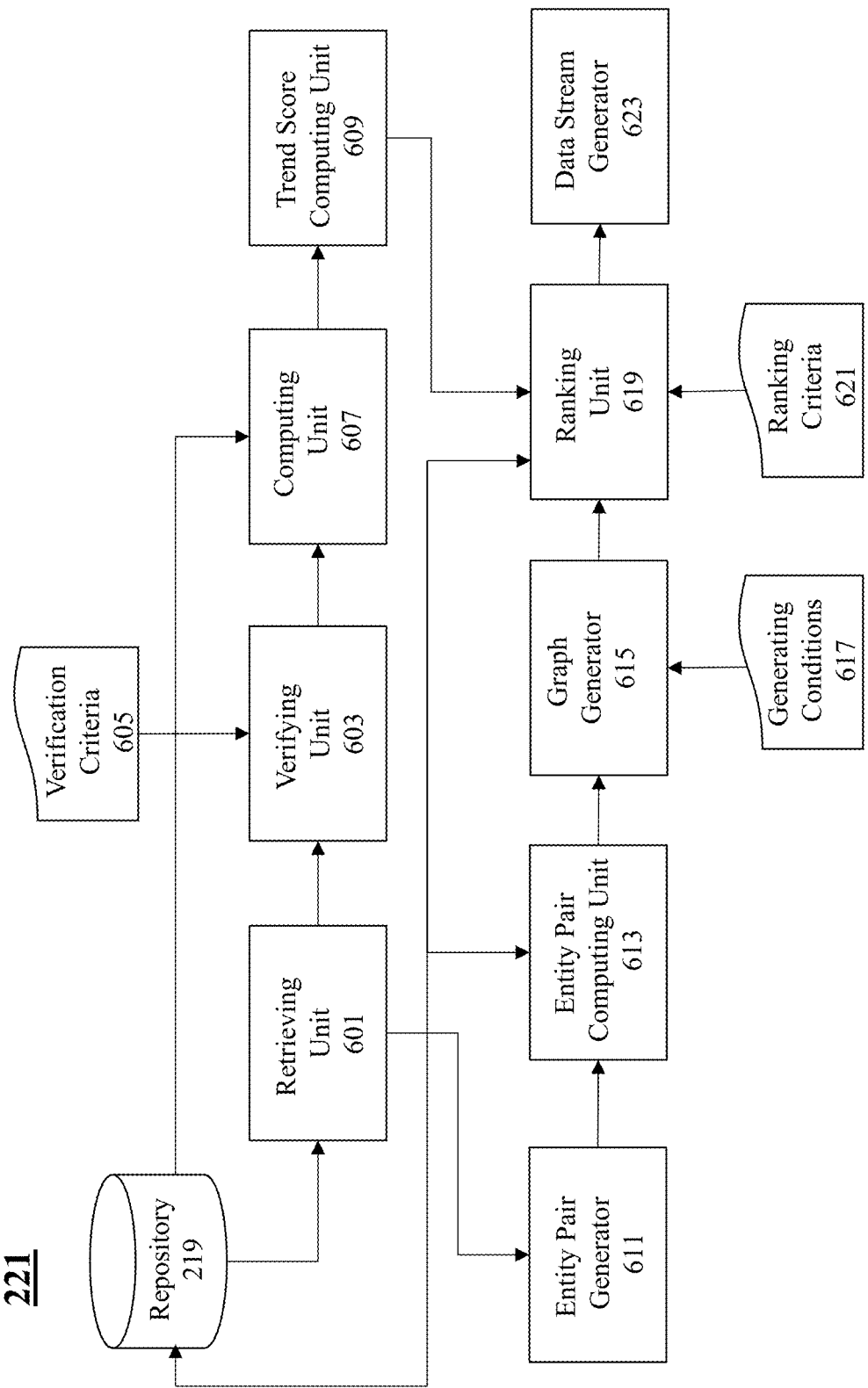
FIG. 6 depicts an exemplary high-level system diagram of an evaluation unit, according to an embodiment of the present teaching.

FIG. 6 depicts an exemplary high-level system diagram of an evaluation unit, according to an embodiment of the present teaching. The evaluation unit 221 includes a retrieving unit 601, a verifying unit 603, a computing unit 607, a trend score computing unit 609, an entity-pair generator 611, an entity-pair computing unit 613, a graph generator 615, a ranking unit 691, and a data stream generator 623. The retrieving unit 601 retrieves entities stored in a repository 219. Note that as stated previously, and as shown in FIG. 4, the entities stored in the repository 219 are associated with a time-window. An entity is associated with a time-window based on a criterion related with the at least one content item from which the entity is extracted. Specifically, the entity is associated with the time-window based on a time instant of extracting the entity from the at least one content item being within a duration of the time-window.

The verifying unit 603 is configured to verify whether a particular time-window including a plurality of entities is ready for further processing. By one embodiment, the verifying unit determines the readiness of the time-window for further processing based on a verification criteria 605. For example, the verification criteria 605 may correspond to determining whether a number of entities included in the time-window are greater than a predetermined threshold number of entities.

For each entity included in a time-window, the computing unit 607 is configured to compute a first parameter corresponding to a number of occurrences of the entity in the time-window, and a second parameter corresponding to an average number of occurrences of the entity in previous time-windows. In other words, the computing unit 607 calculates the first parameter $O_E$, which is equal to publisher mentions for the entity E in the current time-window, and calculates the second parameter $E_E$, which is equal to an average number of publisher mentions derived from the history (a predetermined number of previous time-windows) for the entity E.

The trend score computing unit 609 computes a trendiness score (also referred to as a trending score) for each entity in the time-window. By one embodiment, the trendiness score of the entity is computed as a function of the first parameter and the second parameter. For instance, the trendiness score ($T_{score}$) can be computed as: $T_{score}=(O_E-E_E)^2/(E_E+1)$. The entity-pair generator 611 is configured to generate entity-pairs with respect to the entities included in a time-window. The generated entity-pairs are further processed by the entity-pair computing unit 613. Specifically, the entity-pair computing unit 613 computes, for each entity-pair, a co-occurrence count of the entities (included in the entity-pair) with respect to the plurality of content items. The entity-pairs for which a threshold criterion is satisfied are transmitted to the graph generator 615. By one embodiment, the threshold criterion corresponds to a co-occurrence count of the entity-pair with respect to a plurality of content items exceeding a predetermined count.

The graph generator 615 is configured to generate a graph in accordance with generating conditions 617. By one embodiment of the present disclosure, each node in the graph corresponds to an entity, and two nodes are connected by an arc if the entity pair (i.e., entities corresponding to the two nodes) satisfies the threshold criterion. Accordingly, the graph generator 615 constructs the graph based only on the entity-pairs that satisfy the threshold criterion.

By one embodiment of the present disclosure, the ranking unit 619 is configured to rank content items related to the entity pairs in accordance with ranking criteria 621. The ranked content items are then utilized by the data stream generator to generate a stream of content items that can be provided to a user. Several mechanism may be utilized by the evaluation unit 221 in determining which content items are to be included in the stream of content items as described below.

For sake of discussion, assume that the generated graph includes four nodes (corresponding to entities) E1, E2, E3, and E4. Further, the graph includes three arcs joining nodes E1 and E2, nodes E2 and E4, and nodes E3 and E4, respectively. In other words, the graph is generated based on the three entity-pairs ((E1, E2), (E2, E4), and (E3, E4)) satisfying the threshold criterion. Additionally, assume that the content items associated with the entity-pair (E1, E2) is the set of content items $\{D_1, D_2, D_3, \ldots D_K\}$, associated with the entity-pair (E2, E4) is the set of content items $\{D_{K+1}, D_{K+2}, \ldots D_M\}$, and associated with the entity-pair (E3, E4) is the set of content items $\{D_{M+1}, D_{M+2}, \ldots D_N\}$. It must be appreciated that although the above sets of content items corresponding to the different entity-pairs are disjoint, a particular content item may be associated with one or more entity-pairs.

By one embodiment of the present disclosure, the evaluation unit may utilize the computed trendiness scores of the entities included in the respective entity-pairs to generate the stream of content items. For instance, referring to the above stated example, the evaluation unit may compute an average trendiness score (computed based on the trendiness scores of the entities) of each entity-pair. Further, the average trendiness score may be utilized in ranking the sets of content items to be included in an order in the content stream.

By one aspect of the present disclosure, the evaluation unit 221 may include a clustering unit that is configured to generate one or more clusters associated with each entity-pair. Specifically, the clustering unit may form clusters of content items associated with the entity-pair based on a category of the content items e.g., sports, politics, entertainment, etc. Moreover, the ranking unit 619 may rank the content items within each cluster based on certain ranking criteria e.g., publish time of the content item, trustworthy score of the publisher, etc. The data stream generator may then select one content item (i.e., highest ranked content item) from each cluster to be included in the content stream. It must be appreciated that the techniques of generating the content stream are in no way limited to the exact implementations described above. Rather, the content stream may be generated based on utilizing a combination of the ranking criteria and the trendiness scores of the entities as described above.

Figure 7:
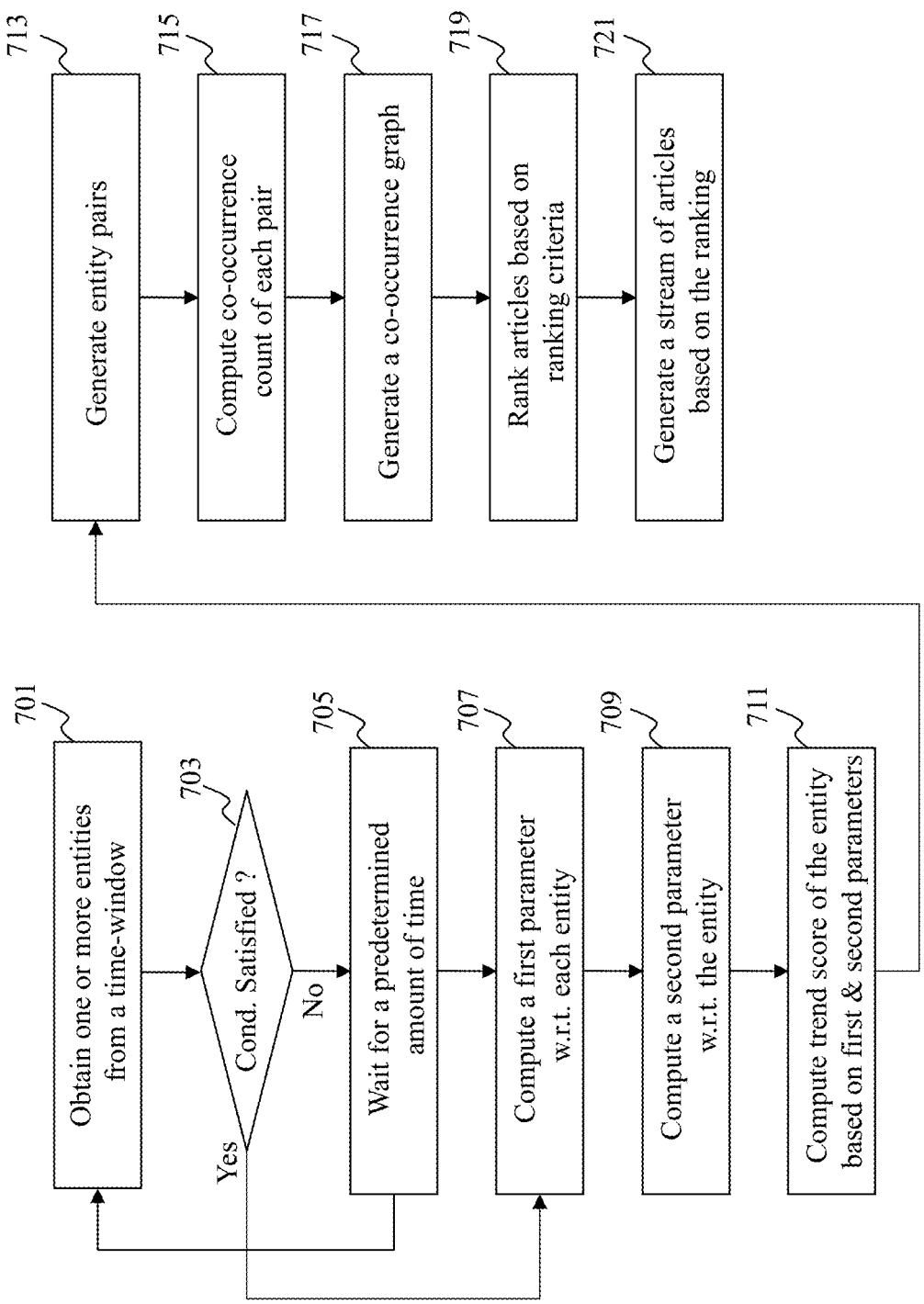
FIG. 7 is a flowchart of an exemplary process performed by an evaluation unit, according to some embodiments of the present teaching.

FIG. 7 depicts a flowchart of an exemplary process performed by an evaluation unit, according to some embodiments of the present teaching. The process commences in step 701, wherein one or more entities associated with a time-window are obtained. At step 703, a query is made to determine whether a condition to continue further processing of the entities in the time-window is satisfied. By one embodiment, the condition may correspond to determining whether a number of entities in the time-window is greater than a predetermined number of entities. If the response to the query is negative, the process moves to step 705, wherein a wait period (of a predetermined amount of time) is encountered. Thereafter, the process loops back to step 701.

If the response to the query in step 703 is affirmative, the process moves to step 707, wherein a first parameter is computed with respect to each entity in the time-window. Thereafter, in step 709, a second parameter is computed for the entity with respect to previous time-windows. The process then moves to step 711, wherein a trending score is computed for the entity based on a function of the first parameter and the second parameter.

The process then proceeds to step 713, wherein a plurality of entity-pairs are generated. In step 715, a co-occurrence count for each entity-pair is calculated with respect to a plurality of content items. The process in step 717 generates a graph based on those entity-pairs which satisfy a threshold criterion as described previously. Further, the process moves to step 719, wherein the content items (e.g., articles) associated with the entity-pairs are ranked based on a ranking criteria. The process in step 721 generates a stream of content items to be provided to a user based on the ranking.

Figure 8:
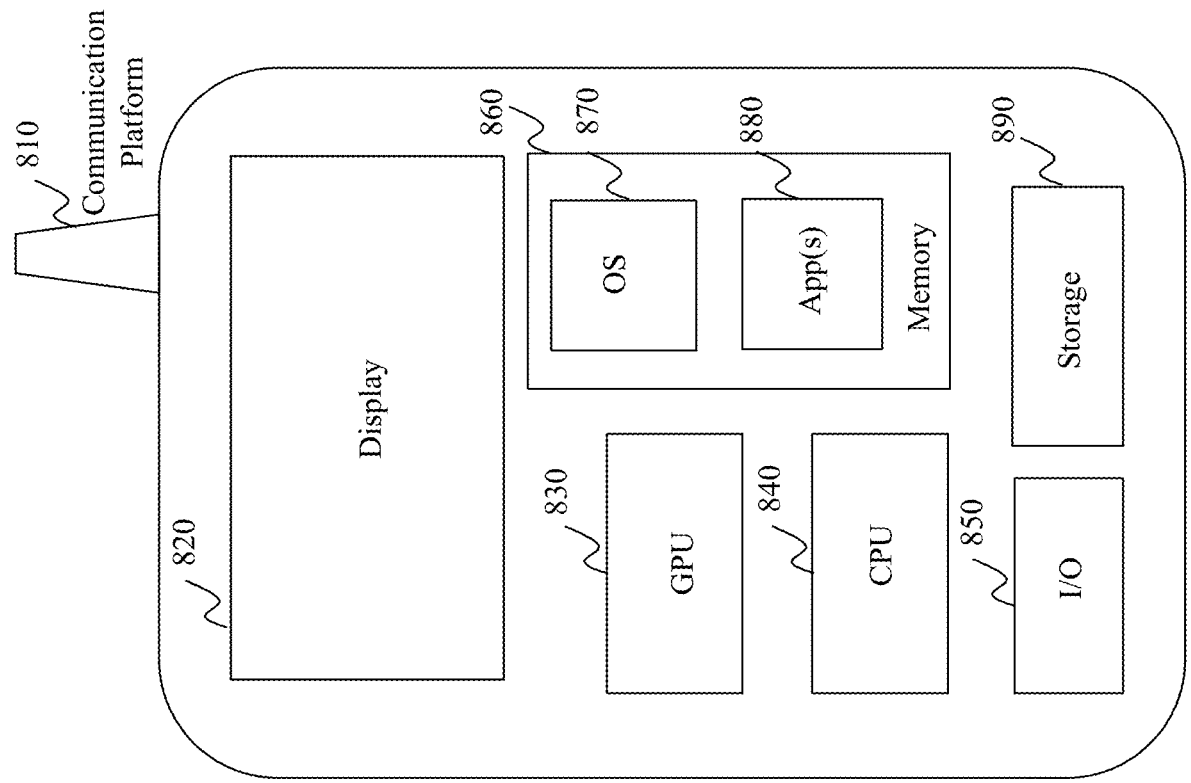
FIG. 8 depicts an architecture of a mobile device which can be used to implement a specialized system incorporating the present teaching.

Turning now to FIG. 8, there is depicted an architecture of a mobile device 800, which can be used to realize a specialized system implementing the present teaching. In this example, a user device on which the functionalities of the various embodiments described herein can be implemented is a mobile device 800, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 800 in this example includes one or more central processing units (CPUs) 840, one or more graphic processing units (GPUs) 830, a display 820, a memory 860, a communication platform 810, such as a wireless communication module, storage 890, and one or more input/output (I/O) devices 850. Any other suitable component, including but not limited to a system bus or a controller (not shown), may also be included in the mobile device 800. As shown in FIG. 8, a mobile operating system 870, e.g., iOS, Android, Windows Phone, etc., and one or more applications 880 may be loaded into the memory 860 from the storage 890 in order to be executed by the CPU 840. The applications 880 may include a browser or any other suitable mobile apps for performing the various functionalities on the mobile device 800. User interactions with the content displayed on the display panel 820 may be achieved via the I/O devices 850.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 9:
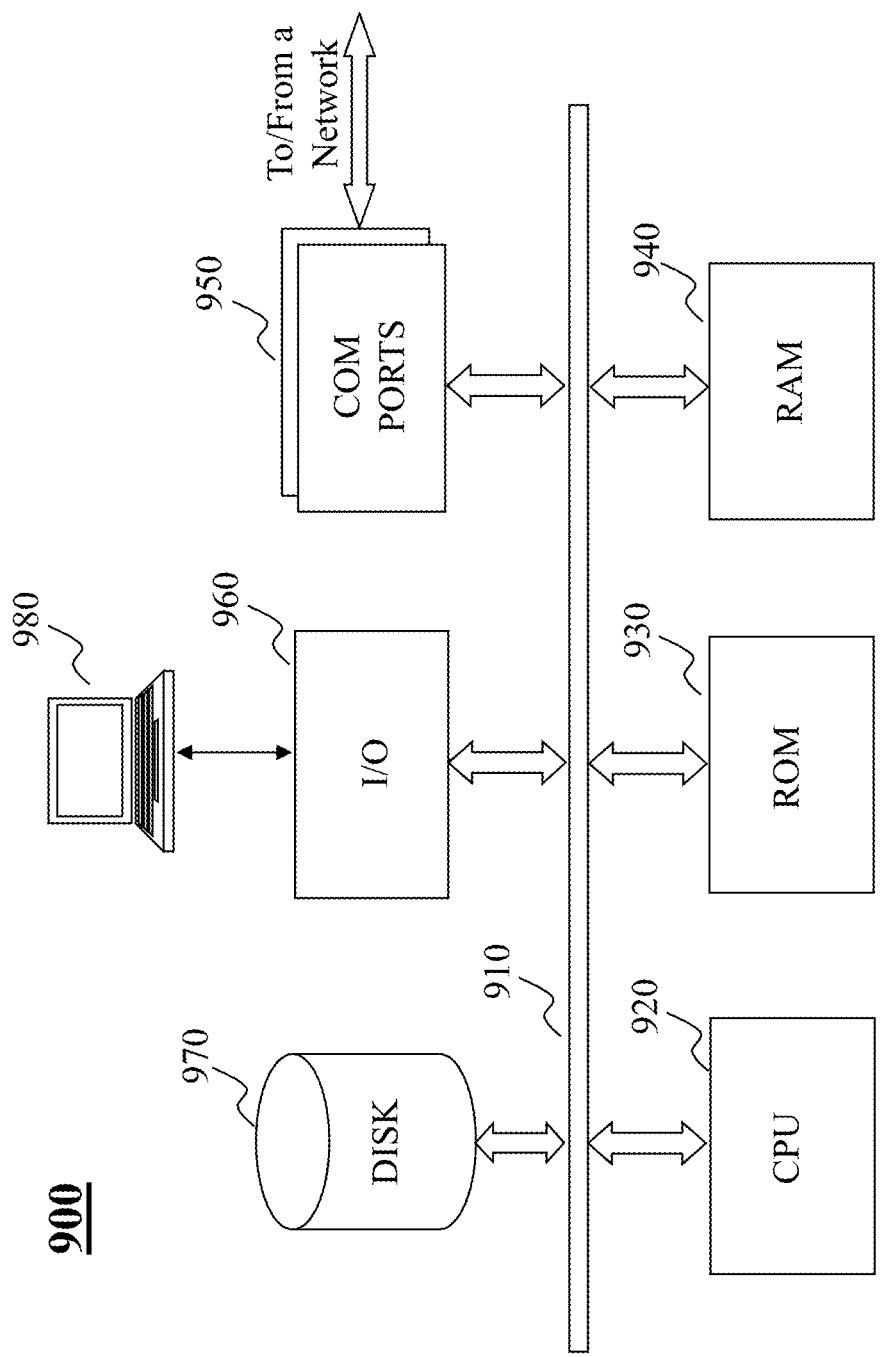
FIG. 9 depicts the architecture of a computer which can be used to implement a specialized system incorporating the present teaching.

FIG. 9 is an illustrative diagram of an exemplary computer system architecture, in accordance with various embodiments of the present teaching. Such a specialized system incorporating the present teaching has a functional block diagram illustration of a hardware platform which includes user interface elements. Computer 900 may be a general-purpose computer or a special purpose computer. Both can be used to implement a specialized system for the present teaching. Computer 900 may be used to implement any component(s) described herein. For example, the present teaching may be implemented on a computer such as computer 900 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 900, for example, may include communication ports 950 connected to and from a network connected thereto to facilitate data communications. Computer 900 also includes a central processing unit (CPU) 920, in the form of one or more processors, for executing program instructions. The exemplary computer platform may also include an internal communication bus 910, program storage and data storage of different forms (e.g., disk 970, read only memory (ROM) 930, or random access memory (RAM) 940), for various data files to be processed and/or communicated by computer 900, as well as possibly program instructions to be executed by CPU 920. Computer 900 may also include an I/O component 960 supporting input/output flows between the computer and other components therein such as user interface elements 980. Computer 900 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the data mining engine into the hardware platform(s) of a computing environment or other system implementing a computing environment or similar functionalities in connection with data mining. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the data mining engine, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of connecting to a network for generating a stream of content items, the method comprising:
   obtaining a plurality of entities associated with a time-window, wherein each entity of the plurality of entities is associated with at least one of content items;
   computing for each entity, a first parameter corresponding to a number of occurrences of the entity in the time-window and a second parameter corresponding to an average number of occurrences of the entity in previous time-windows;
   calculating for each entity, a trendiness score based on a difference between the first parameter and the second parameter;
   generating a graph including one or more entity-pairs with respect to the plurality of entities, wherein a co-occurrence count of entities included in each of the one or more entity-pairs with respect to at least one of the content items exceeds a threshold;
generating one or more clusters of content items associated with each of the one or more entity-pairs, based on categories of the content items associated with each of the one or more entity-pairs;
ranking content items in each of the one or more clusters based on an average trendiness score of entities included in at least one corresponding entity-pair associated with the content items in the cluster; and
generating the stream of content items by selecting a highest ranked content item from each of the one or more clusters to be included in the stream.

2. The method of claim 1, wherein the step of generating the stream of content items is further based on an average trendiness score of each entity-pair included in the graph.

3. The method of claim 1, wherein the step of generating the stream of content items further comprises:
ranking each content item in the stream of content items based on trendiness scores of entities included in the entity-pair corresponding to the content item; and
providing the stream of content items based on the ranking.

4. The method of claim 1, wherein the entity is associated with the time-window based on a second criterion related with the at least one of the content items from which the entity is extracted being satisfied.

5. The method of claim 4, wherein the second criterion corresponds to a time instant of extracting the entity from the at least one of the content items being within a duration of the time-window.

6. A non-transitory machine-readable medium having information recorded thereon for generating a stream of content items, wherein the information, when read by the machine, causes the machine to perform following:
obtaining a plurality of entities associated with a time-window, wherein each entity of the plurality of entities is associated with at least one of content items;
computing for each entity, a first parameter corresponding to a number of occurrences of the entity in the time-window and a second parameter corresponding to an average number of occurrences of the entity in previous time-windows;
calculating for each entity, a trendiness score based on a difference between the first parameter and the second parameter;
generating a graph including one or more entity-pairs with respect to the plurality of entities, wherein a co-occurrence count of entities included in each of the one or more entity-pairs with respect to at least one of the content items exceeds a threshold;
generating one or more clusters, of content items associated with each of the one or more entity-pairs, based on categories of the content items associated with each of the one or more entity-pairs;
ranking content items in each of the one or more clusters based on an average trendiness score of entities included in at least one corresponding entity-pair associated with the content items in the cluster; and
generating the stream of content items by selecting a highest ranked content item from each of the one or more clusters to be included in the stream.

7. The medium of claim 6, wherein the step of generating the stream of content items is further based on an average trendiness score of each entity-pair included in the graph.

8. The medium of claim 6, wherein the step of generating the stream of content items further comprises:
ranking each content item in the stream of content items based on trendiness scores of entities included in the entity-pair corresponding to the content item; and
providing the stream of content items based on the ranking.

9. The medium of claim 6, wherein the entity is associated with the time-window based on a second criterion related with the al least one of the content items from which the entity is extracted being satisfied.

10. The medium of claim 9, wherein the second criterion corresponds to a time instant of extracting the entity from the at least one of the content items being within a duration of the time-window.

11. A system for generating a stream of content items comprising:
a retrieving unit implemented by a processor coupled to a memory and configured to obtain a plurality of entities associated with a time-window, wherein each entity of the plurality of entities is associated with at least one of content items;
a computing unit implemented by the processor and configured to compute for each entity, a first parameter corresponding to a number of occurrences of the entity in the time-window and a second parameter corresponding to an average number of occurrences of the entity in previous time-windows, and
calculate for each entity, a trendiness score based on a difference between the first parameter and the second parameter;
a graph generator implemented by the processor and configured to generate a graph including one or more entity-pairs with respect to the plurality of entities, wherein a co-occurrence count of entities included in each of the one or more entity-pairs with respect to at least one of the content items exceeds a threshold;
a clustering unit implemented by the processor and configured to generate one or more clusters, of content items associated with each of the one or more entity-pairs, based on categories of the content items associated with each of the one or more entity-pairs;
a ranking unit implemented by the processor and configured to rank content items in each of the one or more clusters based on an average trendiness score of entities included in at least one corresponding entity-pair associated with the content items in the cluster; and
a data stream generator implemented by the processor and configured to generate the stream of content items by selecting a highest ranked content item from each of the one or more clusters to be included in the stream.

12. The system of claim 11, wherein the data stream generator is configured to generate the stream of content items further based on an average trendiness score of each entity-pair included in the graph.

13. The system of claim 11, further comprising a ranking unit implemented by the processor and configured to rank each content item in the stream of content items based on trendiness scores of entities included in the entity-pair corresponding to the content item, and wherein the data stream generator is further configured to provide the stream of content items based on the ranking.

14. The system of claim 11, wherein the entity is associated with the time-window based on a second criterion related with the at least one of the content items from which the entity is extracted being satisfied, the second criterion corresponding to a time instant of extracting the entity from the at least one of the content items being within a duration of the time-window.

\* \* \* \* \*